(12) United States Patent
Kopp et al.

(10) Patent No.: US 6,792,169 B2
(45) Date of Patent: Sep. 14, 2004

(54) CHIRAL FIBER SENSOR APPARATUS AND METHOD

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 89 days.

(21) Appl. No.: 10/313,453

(22) Filed: Dec. 6, 2002

(65) Prior Publication Data

US 2003/0118266 A1 Jun. 26, 2003

Related U.S. Application Data

(60) Provisional application No. 60/337,915, filed on Dec. 6, 2001.

(51) Int. Cl.[7] .................................................. G02B 6/00
(52) U.S. Cl. ........................... 385/12; 385/94; 385/128
(58) Field of Search .............................................. 385/12

(56) References Cited

U.S. PATENT DOCUMENTS

| | | | | |
|---|---|---|---|---|
| 3,976,356 A | * | 8/1976 | Jenkins ......................... 385/126 |
| 4,099,835 A | * | 7/1978 | French et al. ................. 385/124 |
| 4,227,771 A | * | 10/1980 | Nolan ............................ 385/126 |
| 4,468,091 A | * | 8/1984 | Schmadel et al. ................ 385/5 |
| 4,949,038 A | * | 8/1990 | Birch et al. ................. 324/244.1 |
| 5,452,394 A | * | 9/1995 | Huang ........................... 385/123 |

* cited by examiner

Primary Examiner—Phan T. H. Palmer
Assistant Examiner—Jennifer Doan
(74) Attorney, Agent, or Firm—Edward Etkin, Esq.

(57) ABSTRACT

A chiral fiber sensor implemented in a chiral fiber is provided that mimics advantageous optical properties of a cholesteric liquid crystal structure. In a passive sensor embodiment the chiral fiber sensor of the present invention includes a chiral fiber element configured to shift its reflection band in response to a change in a particular external condition (such as temperature, pressure and axial twist). The chiral fiber element is subjected to a broadband emission while monitoring its refection or the transmission spectrum. Changes in the monitored spectrum indicate changes in the particular external condition. In an active sensor embodiment, the chiral fiber element is configured as an optically pumped chiral laser having a lasing wavelength that shifts in response to a change in a particular external condition (such as temperature, pressure and axial twist). The lasing wavelength is monitored and shifts in the wavelength indicate changes in the particular external condition.

20 Claims, 5 Drawing Sheets

US 6,792,169 B2

CHIRAL FIBER SENSOR APPARATUS AND METHOD

CROSS REFERENCE TO RELATED APPLICATIONS

The present patent application claims priority from the commonly assigned U.S. provisional patent application Ser. No. 60/337,915 entitled "Chiral Fiber Sensor Apparatus and Method" filed Dec. 6, 2001.

FIELD OF THE INVENTION

The present invention relates generally to sensors based on optical fibers, and more particularly to active and passive sensors utilizing chiral fiber elements.

BACKGROUND OF THE INVENTION

In recent years, passive sensors based on fiber optic elements have found increased use in various industrial and commercial applications. Fiber optic sensors typically utilize a fiber Bragg grating element having predefined stop band gap (reflection band) characteristics centered around a pre-defined wavelength range. A broadband emission source or a continuously tunable laser emit radiation toward the fiber Bragg grating element over a broad range of wavelengths, while a photodetector detects wavelengths reflected by the reflection band. Changes in pressure or temperature (depending on the sensor configuration) cause the reflection band to shift. Thus, because the photodetector monitors the shifts in the wavelengths reflected or transmitted through the fiber Bragg grating, the fiber optic sensor, depending on its configuration, can detect changes in pressure or temperature.

The above description refers to previously known passive sensors. Attempts have been made to design an active sensor based on a fiber Bragg grating. An active sensor requires optically pumping a fiber Bragg grating doped with optically excitable material to produce lasing at a predefined wavelength and then detecting shifts in the wavelength due to temperature or pressure. The advantage of an active sensor is that a broadband (or a continuously tunable) emission source is not required. However, due to the nature of previously known fiber Bragg gratings, a fiber Bragg grating would need to be of significant length (e.g. at least approximately 15 meters) in order to produce lasing, making an active sensor impractical.

Finally, both types of previously known fiber optic sensors suffer from a number of drawbacks. Fiber Bragg gratings are typically manufactured through irradiating, with UV light, an optical fiber made from a UV-sensitive material through a pre-designed phase mask. Another prior-art approach to manufacturing fiber Bragg gratings involves irradiating a UV-sensitive optical fiber with two interfering UV laser beams. In both approaches, the resulting fiber Bragg gratings have two significant disadvantages. First, the requirement that the optical fiber be UV-sensitive limits the application of the prior art sensors in that the sensors cannot be used in an environment in which exposure to UV radiation may occur. Second, the UV-sensitive fiber requirement limits the choice of materials used in fabricating the fiber Bragg gratings. In addition, while previously known fiber Bragg gratings are sensitive to shifts in temperature and pressure, they are not sensitive to axial twisting. Finally, the previously known fiber Bragg gratings are relatively expensive and difficult to manufacture.

It would thus be desirable to provide an optical fiber based sensor that can be used in locations exposed to UV radiation. It would further be desirable to provide an optical fiber based sensor that can be fabricated from any material suitable for optical fibers. It would additionally be desirable to provide an optical fiber based sensor that is responsive to axial twisting. It would also be desirable to provide an active optical fiber based sensor that is small and practical to use. It would further be desirable to provide an optical fiber bases sensor that is easy and inexpensive to manufacture.

SUMMARY OF THE INVENTION

Figure 1A:
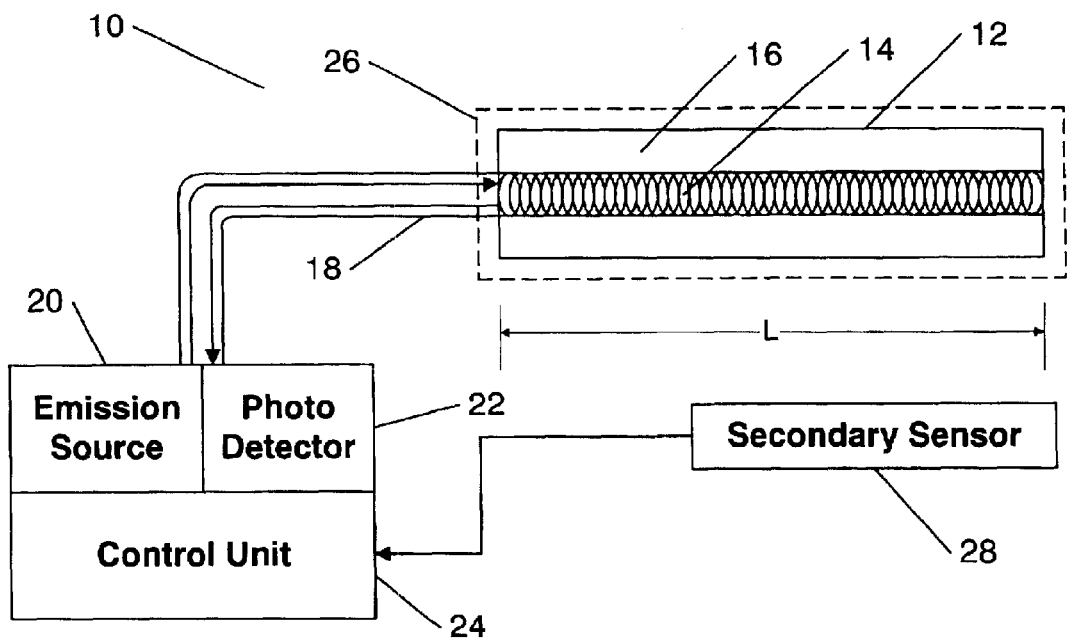
FIG. 1A is a schematic diagram of a first embodiment of a chiral fiber passive sensor of the present invention.

The present invention is directed to a novel chiral fiber sensor that is based on a specially configured optical fiber structure having advantageous optical properties similar to a cholesteric liquid crystal (CLC) structure. The optical fiber structure used in the inventive chiral fiber sensor achieves optical properties similar to a CLC structure because it satisfies the requirement that in a CLC structure the pitch of the structure is twice its period. This is accomplished by using a chiral fiber structure having geometric birefringence with 180 degree symmetry. Such properties may be obtained by imposing two identical coaxial helixes along a fiber structure, where the second helix is shifted by half of the structure's pitch forward from the first helix. Such structures are described in greater detail in the above-incorporated U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", and "Helical Fiber Bragg Grating". Several embodiments of the inventive chiral fiber laser are discussed below.

In essence the inventive chiral fiber sensor is implemented in a chiral fiber structure that mimics advantageous optical properties of a cholesteric liquid crystal structure. In a first passive sensor embodiment, the inventive chiral fiber sensor includes a chiral fiber sensor element configured to shift its reflection band in response to a change in a particular predefined external condition (such as temperature, pressure, axial twist, stretching, etc.). The chiral fiber element is subjected to broadband emission from a broadband emission source while a photodetector monitors its refection or transmission spectrum (depending on initial configuration of the sensor). Changes in the monitored spectrum indicate changes in the particular external condition. An optional control unit, coupled to the photodetector and/or the emission source, may be utilized to measure the magnitude of the change in the monitored spectrum and thus determine the magnitude of change in the external condition.

In an alternate embodiment of the inventive passive chiral fiber sensor, a defect, such as a chiral twist, a spacing or a dielectric material is inserted within the chiral fiber sensor element. The defect causes a long lived photonic defect mode in the center of the reflection band. The defect mode represents a very small transmission range within the reflection band. Because the defect mode is very narrow, minute shifts in the position of the defect mode can be detected by the photodetector when external conditions affect the sensor element, making the defect-based chiral fiber sensor more sensitive. Furthermore, if the defect is adjustable (as may be the case with the chiral twist defect), the inventive passive chiral fiber sensor may be tuned to adjust its response to a particular range of values of external conditions.

In an active sensor embodiment of the present invention, an active chiral fiber sensor element is configured as an optically pumped chiral fiber laser having a lasing wavelength that shifts in response to a change in a particular external condition (such as temperature, pressure, axial twist, stretching, etc.). The lasing wavelength is monitored by a photodetector and shifts in the wavelength indicate changes in the particular external condition. Similarly, a defect may be introduced into the active chiral fiber sensor element to achieve similar advantages to those described above with respect to the passive sensor embodiment.

Optionally, the inventive passive or active chiral fiber sensors can be stabilized (during fabrication or via addition of a separate component) to ensure that the sensor elements are only sensitive to one or more particular predefined external condition.

Because certain external conditions are difficult to monitor or to stabilize against, in an alternate embodiment of the inventive chiral fiber sensor, a secondary sensor may be positioned proximal to the primary chiral fiber sensor and connected to the control unit. The secondary sensor may be a conventional sensor or it may be another inventive chiral fiber sensor that is configured to sense an easy to sense external condition. By comparing the output of the secondary sensor to the output of the primary sensor, the control unit can derive the change in the difficult to sense condition.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to advantageous passive and active sensors based on optical fibers that overcome the disadvantages of previously known optical fiber based sensors. The essence of the invention involves utilization of inventive chiral fibers in place of traditional fiber Bragg gratings to construct advantageous passive and active chiral fiber sensors. Before describing the inventive chiral fiber sensors in greater detail, it would be useful to provide an explanation of the scientific principles behind chiral fibers.

Presently used fiber Bragg gratings may be seen as analogous to 1D layered dielectric media. CLCs are a superior form of 1D periodic structures. Because CLCs exhibit superior properties in comparison to layered media (as disclosed in the above-incorporated U.S. patent applications), the above-incorporated U.S. Patent Application entitled "Helical Fiber Bragg Grating" (hereinafter "HFBG")) disclosed the advantageous implementation of the essence of a cholesteric periodic photonic band gap (hereinafter "PBG") structure in an optical fiber. This novel approach captured the superior optical properties of cholesteric liquid crystals while facilitating the manufacture of the structure as a continuous (and thus easier to implement) process.

In order to accomplish this, the HFBG patent application taught that the inventive structure must mimic the essence of a conventional CLC structure—its longitudinal symmetry. A helical fiber structure appears to have the desired properties. However, in a CLC structure the pitch is twice the period. This is distinct from the simplest realization of the helical structure, which is a single helix. In the single helix structure, the period is equal to the pitch and one might expect to find the band gap centered at the wavelength equal to twice the pitch. However, this arrangement produces a mismatch between the orientation of the electric field of light passing through the structure and the symmetry of the helix. The field becomes rotated by 360 degrees at a distance equal to the wavelength of light of twice the pitch. On the other hand, the helix rotation in this distance is 720 degrees. Thus, while a helical structure has certain beneficial applications it does not truly mimic the desirable CLC structure with one notable exception—when the structure is composed of two different adjacent materials.

Thus, a structure that meets the requirements for producing a reflection band with edges at wavelengths $\lambda_1$ and $\lambda_2$ (see FIG. 5) while preserving the advantages of a cholesteric structure must satisfy two requirements:

(1) that the period of the structure's optical dielectric susceptibility is half the wavelength inside the medium at $\lambda_1$ and $\lambda_2$, and (2) the dielectric susceptibility of the structure rotates so that it is substantially along (perpendicular to) the direction of the field at wavelength $\lambda_1$ ($\lambda_2$).

The HFBG patent application further taught that one of the most advantageous and simple ways to construct a structure satisfying these requirements is to create a double helix structure. In this structure, two identical coaxial helixes are imposed in or on a fiber structure, where the second helix is shifted by half of the pitch forward from the first helix. Another advantageous structure satisfying these requirements is a single helix structure that is composed of two adjacent components of different optical indexes joined together. In this case, the wavelength is equal to the pitch and the pitch is equal to twice the period of the effective optical dielectric susceptibility of the system. The HFBG patent application disclosed several embodiments of such advantageous double and single helix structures in optical fibers that may be fabricated as a matter of design choice. An advantageous apparatus and a method for fabricating double and single helix structures are disclosed in the above-incorporated commonly assigned co-pending U.S. patent application entitled "Apparatus and Method for Manufacturing Helical Fiber Bragg Gratings".

While the chiral fiber sensors of the present invention is described with reference to the above-incorporated embodiments of inventive optical fibers having CLC-like properties derived from their helical or double helical structures (for example, a twisted fiber having a core cross-section shown in FIG. 1B), it should be noted that the inventive chiral fiber sensors may be advantageously constructed utilizing any optical fiber having CLC-like properties (i.e. a photonic stop band) regardless of how those properties are achieved. For example, instead of using a fiber structure having a twisted core (as shown and described in the exemplary embodiments of the present invention), the core may have double helix groove patterns inscribed thereon, or wrapped in a double helix pattern with another dielectric material, or a combination of the two (these and other techniques for producing the desired CLC-like properties in optical fibers are described in greater detail in the HFBG patent application). Furthermore, it should be noted that the various advantageous CLC-related techniques disclosed in the above-incorporated commonly assigned co-pending U.S. Patent Applications may be readily adapted to and advantageously utilized in conjunction with the inventive chiral fiber sensors as a matter of design choice.

Figure 1B:
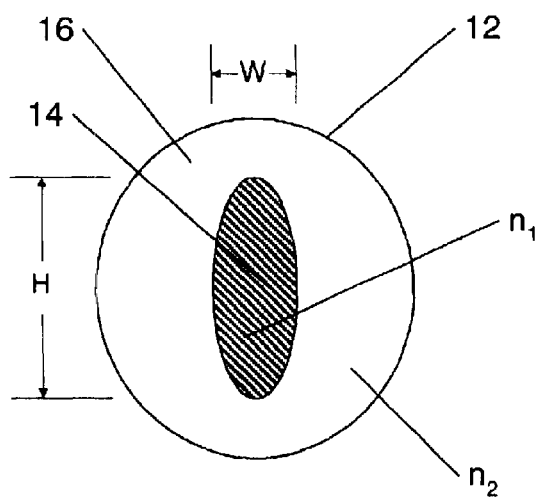
FIG. 1B is a schematic diagram of a cross-section view of a fiber structure of the chiral fiber passive sensor of FIG. 1.

Referring now to FIGS. 1A and 1B, a first embodiment of an exemplary chiral fiber passive sensor 10 is shown. The sensor 10 comprises a chiral fiber sensor element 12, with a core 14 and a cladding 16 surrounding the core 14. Both the core 14 and the cladding 16 may be composed from a variety of optical materials (e.g. glass) selected as a matter of design choice. In accordance with the HFBG patent application, the core 14 is modified to form a double helix structure (for example, by twisting it around its longitudinal axis). A length L of the sensor element 12 is selected as a matter of design choice in accordance with the desired application of the sensor 10. For example, if the sensor 10 is intended to be used along a steel beam to sense stress-induced axial rotation of the beam, L may be substantially equal to the length of the beam.

While an elongated oval core 14 cross section is shown in FIG. 1B, the specific cross-section and dimensions of the core 14 (shown as height H and width W in FIG. 1B) may be selected as a matter of design choice, as long as the core 14 structure maintains 180 degree cross-sectional symmetry, such that when it is twisted, a double helix structure is formed. Thus, the core 14 may have a rectangular cross-section or a generally rectangular cross section with parallel sides but with semicircular top and bottom portions.

When the core 14 is twisted to form the sensor element 12, several control parameters must be configured: the pitch P of the resulting structure, a core 14 index of refraction $n_1$, and a cladding 16 index of refraction $n_2$. In accordance with the present invention, together with the cross-section shape and dimensions H, W of the core 14, one or more of the control parameters P, $n_1$, and $n_2$ are selected- and configured to achieve reflection band characteristics desirable for the sensor application. For example, changing the cross section of the core 14 towards a more cylindrical shape narrows the reflection band and increases the sensitivity of the chiral passive sensor 10. In another example, the pitch P is proportional to the wavelength $\lambda_c$ at the center of the reflection band, and thus, selection of a particular value of P determines the position of the reflection band in the overall transmission spectrum.

An optical fiber connector 18 is connected to one of the ends of the sensor element 12 and to a broadband emission source 20. The length of the fiber connector 18 may be selected as a matter of design choice. For example, if the passive sensor 10 is configured for use in either remote or in a confined or inaccessible space, the fiber connector 18 may be of a significant length. The broadband emission source 20 may be any source capable of emitting electromagnetic radiation at a broad spectrum of wavelengths. Optionally, the broadband emission source 20 may be a continuously tunable laser that is repeatedly and sequentially tuned to produce lasing at a range of wavelengths. The fiber connector 18 is also connected to a photodetector 22 for detecting the spectrum of electromagnetic radiation reflected by the sensor element 12. Optionally, as a matter of design choice, the fiber connector 18 may be implemented as two separate fiber elements (one for the emission source 20 and another for the photodetector 22) without departing from the spirit of the invention.

Figure 5:
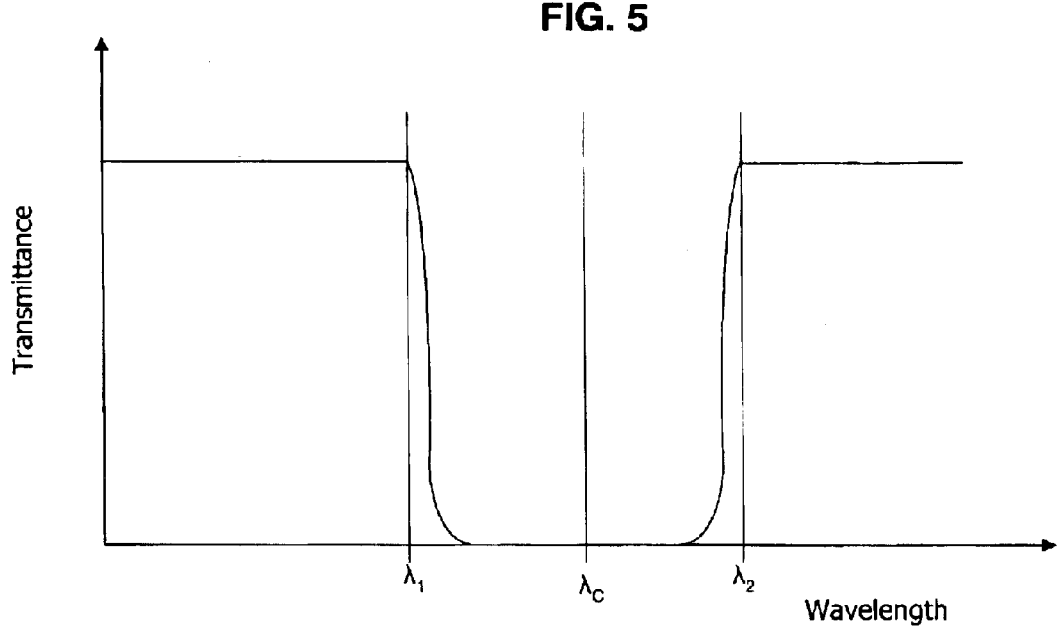
FIG. 5 is a diagram of transmittance versus wavelength in the first embodiment of the inventive chiral fiber passive sensor of FIG. 1 showing the photonic band gap and the photonic band edge modes.

Referring now to FIG. 5, an exemplary reflection band is shown with band edge wavelengths $\lambda_1$ and $\lambda_2$, and a central band wavelength $\lambda_c$. The photodetector 22 monitors shifts in the reflection band centered on the central band wavelength $\lambda_c$. Optionally, the photodetector 22 may be configured to derive the transmission spectrum from the reflection spectrum, and thus monitor shifts in the band edge wavelengths $\lambda_1$ and $\lambda_2$, Alternately, the photodetector 22 can be positioned on the other end of the sensor element 12 to readily monitor the transmission spectrum rather than the reflection spectrum (not shown).

Returning now to FIG. 1A, both the broadband emission source 20 and the photodetector 22 may be connected to an optional sensor control unit 24. The control unit 24 selectively controls the broadband emission source 20 and interprets the shifts in the monitored wavelength detected by the photodetector 22. For example, while a photodetector 22 can sense that a shift has occurred indicating a change in pressure or temperature (depending on the configuration of the passive sensor 10), the control unit 24 can advantageously determine the magnitude of the wavelength shift, and thus, the magnitude of the change in pressure or temperature.

Because changes in pressure (compression or stretching), axial twisting, and changes in temperature cause the reflection band of the chiral fiber sensor element 12 to shift (by slightly altering the structure of the sensor element 12), the passive sensor 10 can be configured to sense one or more of the above listed conditions acting on the sensor element 12. For some applications, the sensor element 12 may be configured with an optional stabilizer 26 that may be selected as a matter of design choice to ensure that the passive sensor 10 is only responsive to one or more specific types of changes in external conditions. For example, if the passive sensor 10 is designed for sensing temperature, the stabilizer 26 protects the sensor element 12 against changes in pressure and axial twisting to ensure that the passive sensor 10 only responds to changes in temperature. Thus, the exact configuration of the stabilizer 26 depends on the desired application of the passive sensor 10. In the above example, the stabilizer 26 may be a rigid temperature-sensitive housing. In another example, where the passive sensor 10 is configured for sensing axial and longitudinal stress, the stabilizer 26 may be an insulated coating that protects the sensor element 12 from being affected by external changes in temperature. Optionally the stabilizer 26 is not a separate physical structure but is instead a process applied to the sensor element 12 during fabrication to make it insensitive to one or more external conditions.

The passive sensor 10 operates as follows, by way of example. The sensor element 12 is configured to be responsive to one or more specific types of change in external conditions, for example temperature, if necessary by utilizing a specific stabilizer 26. The broadband emission source 20 emits light at a broad range of wavelengths that encompasses the wavelengths in the reflection band of the sensor element 12. This light is transmitted to the sensor element 12 via the fiber connector 18. The wavelengths falling into the reflection band are reflected back through the fiber connector 18 and monitored by the photodetector 22. Thus, during ordinary operation of the passive sensor 10, there is continuous emission (by the broadband emission source 20), reflection (by the sensor element 12) and monitoring (by the photodetector 22). When the structure of the sensor element 12 is changed by a predetermined external condition (for example, temperature), the reflection band shifts, causing a change in the wavelengths $\lambda_1$, $\lambda_2$ and $\lambda_c$ (see FIG. 5). The photodetector 22 senses the shift of one or more of the wavelengths (depending on whether the photodetector 22 is configured to monitor the reflection spectrum or the transmission spectrum) and indicates that a change in the monitored condition (e.g., temperature, pressure, axial twist) has occurred. The optional control unit 24 may further provide a measurement of the degree of change depending on the exact proportional shift of the monitored wavelength (or wavelength range).

Because certain external conditions are difficult to monitor or to stabilize against, in an alternate embodiment of the inventive chiral fiber sensor 10, in which the sensor element 12 is configured to sense a first external condition and a second external condition, a secondary sensor element 28 may be positioned proximal to the sensor element 12 and connected to the control unit 24. The secondary sensor element 28 may be a conventional sensor (for example a temperature sensor) or it may be another chiral fiber sensor element similar to sensor element 12 except that the secondary sensor element 28 is configured to sense only the second external condition. By comparing the output of the secondary sensor to the output of the primary sensor, the control unit can derive the change in the first external condition. This arrangement is particularly advantageous when the first external condition is difficult to sense. For example if the first and second external conditions are pressure and temperature, respectively, the sensor element 12 is configured to sense both pressure and temperature while the secondary sensor element 28 is configured to sense only temperature. The control unit 24 is able to derive a change in pressure by comparing the response of the sensor element 12 (representative of changes in pressure and temperature) to the response of the secondary sensor element 28 (representative of a change in temperature only). It should be understood that if the sensor element 12 is configured to sense three or more external conditions, more than one secondary sensor 28, each sensing a different individual external condition may be utilized to derive a change in one of the external conditions sensed by the sensor element 12 without departing from the spirit of the invention.

Figure 2:
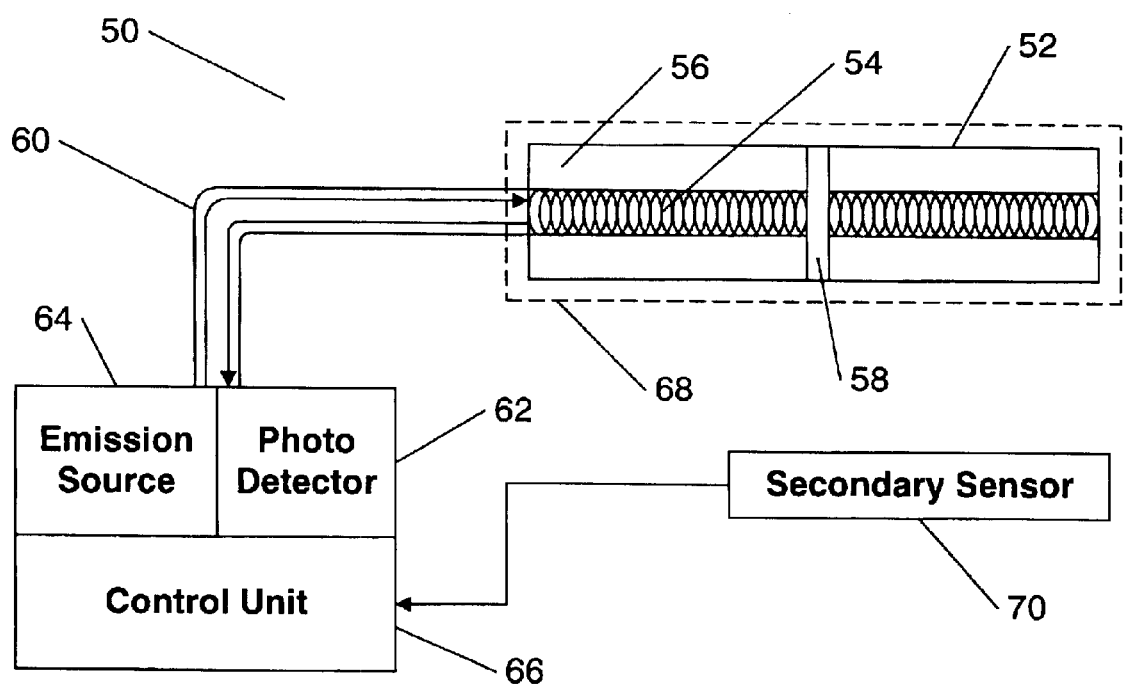
FIG. 2 is a schematic diagram of a second embodiment of a chiral fiber passive sensor of the present invention incorporating a chiral defect.

Referring now to FIG. 2, a second embodiment of an exemplary chiral fiber passive sensor 50 is shown. The passive sensor 50 comprises a chiral fiber sensor element 52 with a core 54 and a cladding 56 surrounding the core 54. The sensor 50 also includes an optical fiber connector 60, a broadband emission source 62, a photodetector 64, an optional control unit 66, an optional stabilizer 68 and an optional secondary sensor 70. The core 54, the cladding 56, the optical fiber connector 60, the broadband emission source 62, the photodetector 64, the control unit 66, the stabilizer 68, and the secondary sensor 70 substantially correspond, respectively, to the core 14, the cladding 16, the optical fiber connector 18, the broadband emission source 20, the photodetector 22, the control unit 24, the stabilizer 26, and the secondary sensor 28, described in detail above in connection with FIG. 1A. The passive sensor 50 is thus substantially similar to the passive sensor 10 of FIG. 1A, except that a defect 58, such as a chiral twist, a spacing, a dielectric material insert or a combination of the defects, is positioned within the sensor element 52. The various defect 58 configurations are described in greater detail below in connection with FIGS. 3A–3C.

Figure 6:
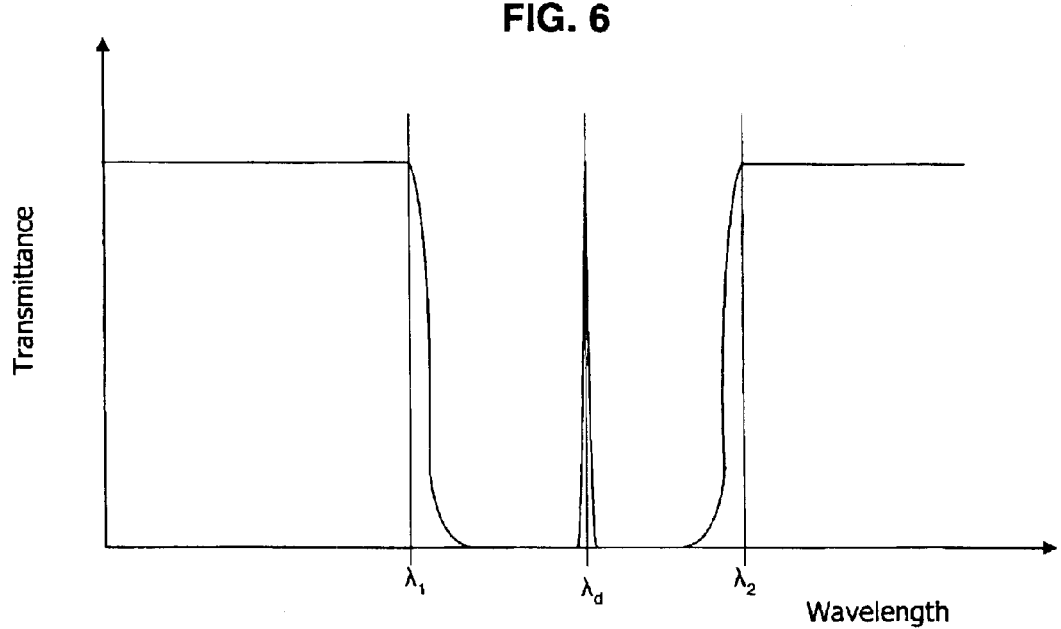
FIG. 6 is a diagram of transmittance versus wavelength in the first embodiment of the inventive chiral fiber passive sensor of FIG. 2 showing the photonic band gap, the photonic band edge modes, and the defect mode.

The defect 58 causes a long lived photonic defect mode (hereinafter "defect mode") in the center of the reflection band (see FIG. 6, the defect mode is centered at wavelength $\lambda_d$). The defect mode represents a very small transmission range within the reflection band. The photodetector 62 is preferably configured (or positioned) to monitor the transmission spectrum of the sensor element 52. Because the defect mode is very narrow, minute shifts in the position of the defect mode can be detected by the photodetector 62 when external conditions affect the structure of the sensor element 52. Accordingly, the passive sensor 50 is more sensitive than the passive sensor 10 for certain applications. For example, if the defect 58 is configured as a chiral twist, the passive sensor 50 becomes particularly sensitive to axial twisting of the sensor element 52. The novel chiral twist defect is described in greater detail in a commonly assigned co-pending U.S. patent application entitled "Chiral Twist Laser and Filter Apparatus and Method", which is hereby incorporated by reference in its entirety.

Figure 3A:
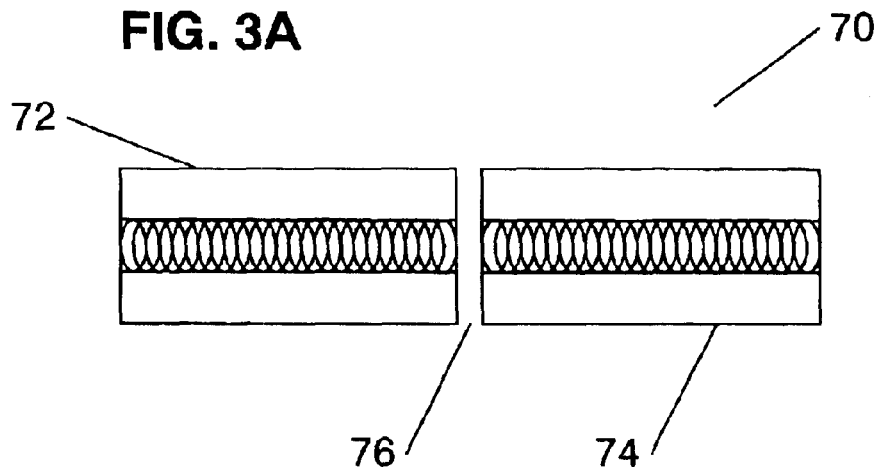
FIGS. 3A, 3B and 3C are schematic diagrams of alternate embodiments of the chiral fiber structure of the chiral fiber laser of FIG. 2 utilizing a defect introduced into the fiber structure.
Figure 3B:
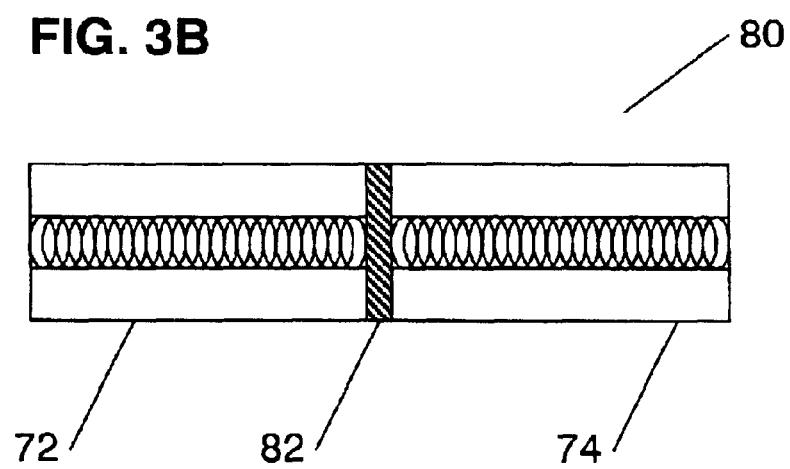
Figure 3C:
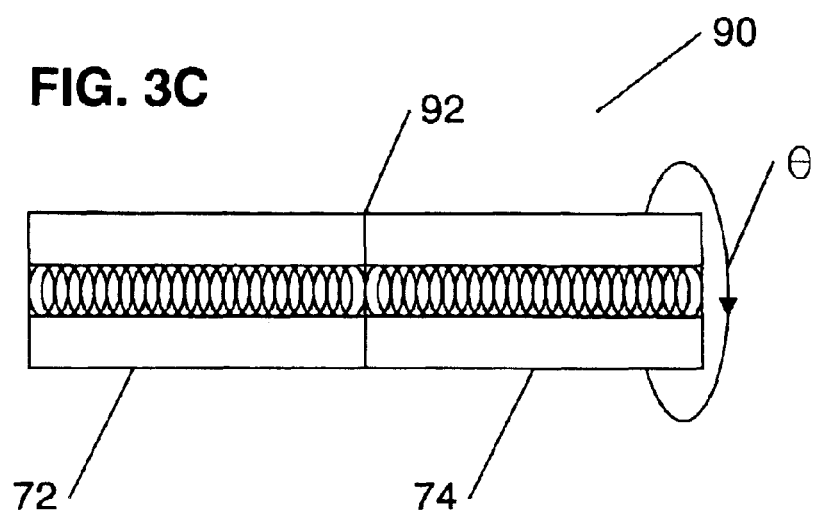

Referring now to FIGS. 3A–3C, various embodiments of the sensor element 52 having the defect 58 defined therein are shown as sensor elements 70, 80 and 90. Introduction of the defect 58 into the sensor element 52 produces a long-lived photonic defect mode in the center of the photonic stop band, as described in the above-incorporated commonly assigned U.S. Patents "Chiral Laser Apparatus and Method", and "Chiral Twist Laser and Filter Apparatus and Method".

Referring now to FIG. 3A, a sensor element 70 is shown where a defect 76 is introduced by spacing apart two sequential longitudinally aligned sensor element portions 72 and 74 at a predetermined distance.

Referring now to FIG. 3B, a sensor element 80 is shown where a defect 82 is introduced by spacing apart two sequential longitudinally aligned structure portions 72 and 74 at a predetermined distance and then introducing a dielectric material between the portions 72, 74.

Referring now to FIG. 3C, a sensor element 90 is shown where a twist defect 92 is introduced by twisting one of the portions 72, 74 at a predetermined circumferential angle with respect to the other portion at a predefined twist angle θ. Preferably, the angle θ is 90 degrees, but the change in angle θ is what enables sensitivity of the sensor element 90 to axial twisting.

A combination of one more defects 76, 82, 92, described in FIGS. 3A–3C, may be utilized as a matter of design choice without departing from the spirit of the present invention.

In an alternate embodiment of the present invention applicable to passive chiral fiber sensors 10 and 50 of FIGS. 1A and 2, the broadband sources 20, 62 may be replaced with a laser tuned to a wavelength matching a wavelength positioned at a band edge of one of the long lived photonic modes (i.e. having a lasing wavelength corresponding to $\lambda_1$ or $\lambda_2$. Optionally, a microwave radiation source could be utilized as the broadband emission sources 20, 62.

Figure 4:
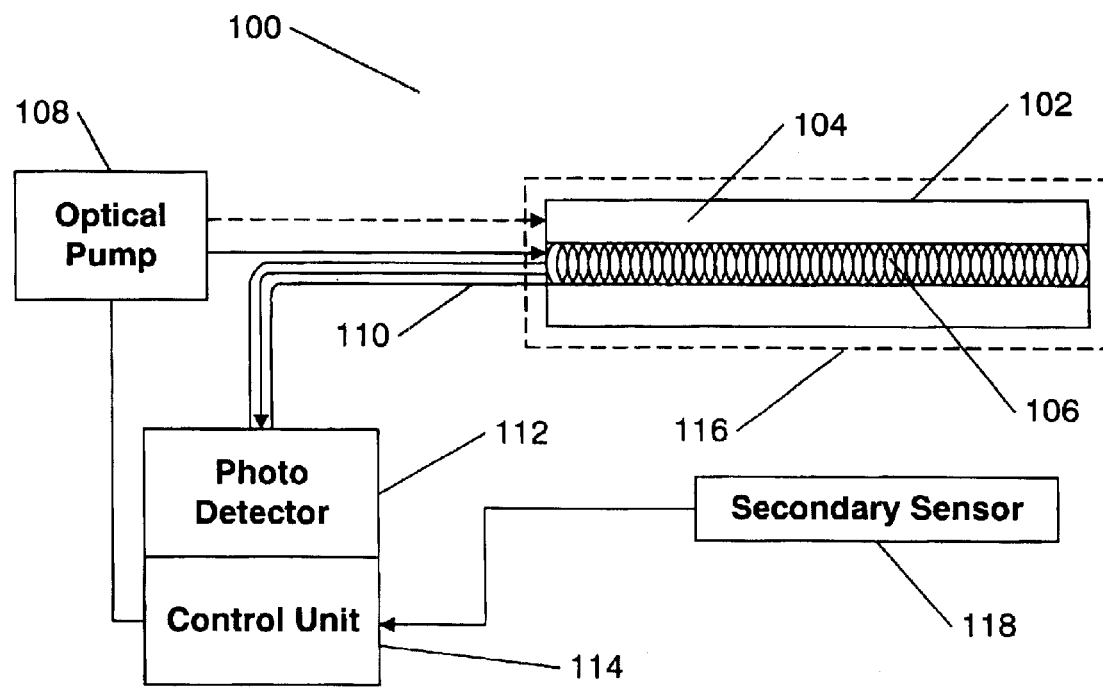
FIG. 4 is a schematic diagram of a chiral fiber active sensor of the present invention.

Referring now to FIG. 4, a first embodiment of a chiral fiber active sensor 100 is shown. The difference between the active fiber optic sensor 100 and the passive fiber optic sensor 10, 50 is that while a passive sensor requires a broadband emission source, an active sensor is configured as a laser that shifts lasing wavelengths in response to changes in the external conditions. The main advantage of an active sensor is that because lasing wavelengths are very narrow, even minute shifts may be readily detected—thus active sensors are significantly more sensitive than passive sensors. The active sensor 100 comprises a chiral fiber active sensor element 102 with a core 104 and a cladding 106 surrounding the core 104. Both the core 104 and the cladding 106 may be composed from a variety of optical materials (e.g. glass) selected as a matter of design choice. In accordance with the HFBG patent application, the core 104 is modified (for example, twisted) to form a double helix structure. Preferably, at least one of the core 104 and the cladding 106 is doped with an optically excitable material, such as Erbium. While an elongated oval core 104 cross section may be advantageous, the specific cross-section and dimensions of the core 104 may be selected as a matter of design choice as long as the base core structure is symmetrical under a 180 degree rotation, such that when it is twisted, a double helix structure is formed. Preferably, the entire active sensor element 102 is configured as a chiral fiber laser described in greater detail in a commonly assigned co-pending U.S. patent application entitled "Chiral Fiber Laser Apparatus and Method" (hereinafter "CFL Patent Application"), which is hereby incorporated by reference in its entirety.

The active sensor element 102 is optically pumped by an optical pump 108 and produces lasing at a wavelength corresponding to one of the band edge modes at wavelengths $\lambda_1$ or $\lambda_2$ (see FIG. 5). Optionally, if a defect (not shown) is introduced into the active sensor element 102, lasing will occur at the defect wavelength $\lambda_d$ (see FIG. 6). One or more of the defects 76, 82, and 92 shown in FIGS. 3A–3B may be readily used as a defect in the active sensor element 102.

The optical pump 108 may be any one of the pump configurations disclosed in the above-incorporated CFL Patent Application. An optical fiber connector 110 is connected to one end of the active sensor element 102 and to a photodetector 112 for monitoring shifts in the lasing wavelength emitted by the active sensor element 102. The length of the fiber connector 110 may be selected as a matter of design choice. For example, if the chiral fiber active sensor 100 is configured for use in a remote, confined, or difficult to access space, the fiber connector 110 may be of a significant length. Optionally, as a matter of design choice, the fiber connector 110 may be implemented as two separate fiber elements (one for the optical pump 108 and another for the photodetector 112) without departing from the spirit of the invention. Optionally, the optical pump 108 may be positioned proximal to the active sensor element 102—in this case, the fiber connector 110 only connects the photodetector 112 to the active sensor element 102.

The photodetector 112 may be connected to an optional sensor control unit 114. The control unit 114 interprets the shifts in the monitored wavelength detected by the photodetector 112. For example, while a photodetector 112 can sense that a shift of the lasing wavelength has occurred indicating a change in pressure or temperature (depending on the configuration of the active sensor 100), the control unit 114 can advantageously determine the magnitude of the wavelength shift and thus the magnitude of the change in pressure or temperature.

Because changes in pressure (compression or stretching), axial twisting, and changes in temperature cause the reflection band of the chiral fiber active sensor element 102 to shift (by slightly altering the structure of the active sensor element 102), the active sensor 100 can be configured to sense one or more of the above listed conditions acting on the active sensor element 102. Optionally, the active sensor element 102 may be configured with a stabilizer 116 that may be selected as a matter of design choice to ensure that the active sensor 100 is only responsive to one or more specific types of change in external conditions. For example, if the active sensor 100 is designed for sensing temperature, the stabilizer 116 protects the active sensor element 102 against changes in pressure and axial twisting to ensure that the active sensor 100 only responds to changes in temperature. Thus, the exact configuration of the stabilizer 116 depends on the desired application of the active sensor 100. In the above example, the stabilizer 116 may be a rigid temperature-sensitive housing. Optionally the stabilizer 116 is not a separate physical structure but is instead a process applied to the active sensor element 102 during fabrication to make it insensitive to one or more external conditions.

Optionally, a secondary sensor element 118 may be connected to the control unit 114 and utilized in a manner as described above in connection with the secondary sensor element 28 (FIG. 1A). The secondary sensor element 118, may be a conventional sensor, or configured as one of the sensor elements 12, 52 or 102.

The active sensor 100 operates as follows, by way of example. The active sensor element 102 is configured to be responsive to one or more types of changes in external conditions, for example temperature, if necessary by utilizing a specific stabilizer 116. The optical pump 108 pumps the active sensor element 102 causing lasing at a predefined lasing wavelength. The lasing wavelength is then monitored by the photodetector 112. Thus, during ordinary operation of the active sensor 100, there is a continuous cycle of lasing (by the active sensor element 102) and monitoring (by the photodetector 112). When the structure of the active sensor element 102 is changed by a predetermined external condition (for example, temperature), the reflection band shifts causing a change in the lasing wavelengths (i.e. in $\lambda_1$, $\lambda_2$ or $\lambda_d$ depending on the configuration of the active sensor element 102). The photodetector 112 senses the shift of the lasing wavelength and indicates that a change in the monitored condition(s) (e.g., temperature, pressure, axial twist) has occurred. The optional control unit 114 may further provide a measurement of the change depending on the exact shift of the monitored lasing wavelength. Because it is easier to detect even a minute shift of a lasing wavelength as opposed to a shift in the reflection band, the active sensor 100 is more sensitive than a passive sensor 10. In addition, the novel structure of the chiral fiber active sensor element 102 enables construction of an active sensor element that is very small (several millimeters) as compared to an equivalent prior art fiber Bragg grating which would need to be many meters long to serve as an active sensor element.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral fiber sensor comprising:
   an elongated chiral optical fiber having a transmission/reflection spectrum, wherein said spectrum shifts in response to a change in at least one of a plurality of external conditions acting on said chiral optical fiber;

stabilizing means for restricting said plural external conditions acting on said chiral optical fiber to said at least one predefined external condition; and a monitoring device operable to monitor a shift in said spectrum in response to a change in said at least one predefined external condition.

2. The chiral fiber sensor of claim 1 wherein said transmission/reflection spectrum comprises a reflection band.

3. The chiral fiber sensor of claim 2, wherein said monitoring device comprises:

radiation means for delivering radiation to said chiral optical fiber, such that said chiral optical fiber reflects a first plurality of wavelengths corresponding to said reflection band and transmits a second plurality of all other wavelengths; and detection means for monitoring shifts in one of said first plural reflected wavelengths and said second plural transmitted wavelengths.

4. The chiral fiber sensor of claim 3, wherein said detection means comprise:

a photodetector operable to sense shifts in one of said first plural reflected wavelengths and said second plural transmitted wavelengths and provide an output signal representative of said shifts; and a control unit, connected to said photodetector, operable to derive a magnitude of change in said at least one plural external condition in response to said output signal.

5. The chiral fiber sensor of claim 4, wherein said defect comprises at least one of a spacing between two sequential longitudinal portions of said chiral optical fiber, a dielectric material insert between said sequential portions, and a longitudinal chiral twist at a predefined angle between said sequential portions.

6. The chiral fiber sensor of claim 2, wherein said reflection band comprises a plurality of long-lived photonic modes occurring therein, wherein said chiral optical fiber comprises a core, cladding around said core, active dopant disposed throughout at least one of the core and the cladding, wherein said doped chiral optical fiber is configured to select a first lasing wavelength corresponding to a particular long-lived photonic mode from said plural long-lived photonic modes, said chiral fiber sensor further comprising:

excitation means, applied to said doped chiral optical fiber, for causing the doped chiral optical fiber to emit electromagnetic radiation, wherein said doped chiral optical fiber is configured to produce peak gain substantially positioned at said particular long-lived photonic mode, such that lasing output occurs at a lasing wavelength corresponding to a position of said particular long-lived photonic mode in said reflection band, and wherein said monitoring means is configured for monitoring a shift of said lasing wavelength in response to a change in said at least one predefined external condition.

7. The chiral fiber sensor of claim 1, wherein said plural external conditions comprise at least one of: temperature, pressure, stretching, and axial twisting.

8. The chiral fiber sensor of claim 1, wherein said chiral optical fiber further comprises a defect disposed therein causing said spectrum to form a narrow transmission peak, and wherein said monitoring device is further operable to detect a spectral shift of said transmission peak in response to a change in said at least one predefined external condition.

9. The chiral fiber sensor of claim 8, wherein said monitoring device comprises:

radiation means for delivering radiation to said chiral optical fiber, such that said chiral optical fiber transmits said radiation at said transmission peak; and detection means for monitoring shifts of said transmission peak.

10. The chiral fiber sensor of claim 9, wherein said detection means comprise:

a photodetector operable to sense said shifts in said defect wavelength and provide an output signal representative of said shifts; and a control unit, connected to said photodetector, operable to derive a magnitude of change in said at least one plural external condition in response to said output signal.

11. The chiral fiber sensor of claim 9, wherein said radiation means comprises one of: a broadband radiation source, a continuously tunable laser source, and locked wavelength laser source.

12. The chiral fiber sensor of claim 1, wherein said at least one predefined external condition comprises a first predefined external condition and at least one additional predetermined external condition, further comprising:

at least one additional sensor, positioned proximal to said elongated chiral optical fiber, and operable to sense changes in said at least one additional predetermined external condition;

control means, connected to said monitoring device and said at least one additional sensor, operable to derive changes in said first predefined external condition from:

i) a shift in said spectrum in response to a change in said at least one predefined external condition; and ii) changes in said at least one additional predetermined external condition.

13. The chiral fiber sensor of claim 12, wherein said at least one additional sensor comprises at least one additional elongated chiral optical fiber connected to said monitoring device.

14. A chiral fiber sensor comprising:

an elongated chiral optical fiber having a first end and a second end, and a reflection band, wherein said reflection band shifts position in response to a change in at least one of a plurality of external conditions acting on said chiral optical fiber;

stabilizing means for restricting said plural external conditions acting on said chiral optical fiber to at least one predefined external condition;

an elongated optical fiber having a third end and a fourth end, said elongated optical fiber third end being connected to said first end of said chiral optical fiber;

radiation means, connected to said fourth end of said elongated optical fiber, for delivering radiation to said chiral optical fiber, such that said chiral optical fiber reflects a first plurality of wavelengths corresponding to said reflection band and transmits a second plurality of all other wavelengths; and detection means, connected to said fourth end of said elongated optical fiber, for monitoring shifts in one of said first plural reflected wavelengths and said second plural transmitted wavelengths in response to a change in said at least one predefined external condition.

15. A method for sensing changes in least one of a plurality of external conditions, comprising the steps of:

(a) providing an elongated chiral optical fiber having a reflection band, wherein said reflection band shifts position in response to a change in at least one of said plurality of external conditions acting on said chiral optical fiber;

(b) restricting said plural external conditions acting on said chiral optical fiber to at least one predefined external condition; and (c) monitoring a shift in said reflection band in response to a change in said at least one predefined external condition.

16. The method of sensing of claim 15, wherein said plural external conditions comprise: temperature, pressure, stretching, and axial twisting.

17. The method of sensing of claim 15, wherein said step (c) comprises the steps of:

(d) delivering radiation to said chiral optical fiber, such that said chiral optical fiber reflects a first plurality of wavelengths corresponding to said reflection band and transmits a second plurality of all other wavelengths; and (e) monitoring shifts in one of said first plural reflected wavelengths and said second plural transmitted wavelengths in response to a change in said at least one predefined external condition.

18. A chiral fiber sensor comprising:

an elongated chiral optical fiber having a reflection band, wherein said reflection band shifts position in response to a change in at least one of a plurality of external conditions acting on said chiral optical fiber; and monitoring device operable to monitor a shift in said reflection band in response to a change in said at least one of said plural external conditions.

19. The chiral fiber sensor of claim 18, wherein said at least one of said plural external condition comprises a first predefined external condition and at least one additional external condition, further comprising:

at least one additional sensor, positioned proximal to said elongated chiral optical fiber, and operable to sense changes in said at least one additional external condition;

control means, connected to said monitoring device and said at least one additional sensor, operable to derive changes in said first predefined external condition from:

i) a shift in said spectrum in response to a change in said at least one of said plural external condition; and ii) changes in said at least one additional external condition.

20. The chiral fiber sensor of claim 19, wherein said at least one additional sensor comprises at least one additional elongated chiral optical fiber connected to said monitoring device.

* * * * *